United States Patent [19]

Sharp

[11] 4,162,407
[45] Jul. 24, 1979

[54] TRAY FOR X-RAY FILM CASSETTES

[75] Inventor: James D. Sharp, Laverne, Calif.

[73] Assignee: MAP International, Wheaton, Ill.

[21] Appl. No.: 844,806

[22] Filed: Oct. 25, 1977

[51] Int. Cl.² .................................................. G11B 1/00
[52] U.S. Cl. .................................... 250/468; 250/470; 354/275; 354/279
[58] Field of Search ................... 250/470, 475 R, 468; 220/287; 206/562, 563, 564; 354/159, 279, 275

[56] References Cited
U.S. PATENT DOCUMENTS

| | | | |
|---|---|---|---|
| 1,447,972 | 3/1923 | Faber | 354/279 |
| 3,771,781 | 11/1973 | Lackey et al. | 250/468 |

*Primary Examiner*—Craig E. Church
*Assistant Examiner*—Thomas P. O'Hare
*Attorney, Agent, or Firm*—Allegretti, Newitt, Witcoff & McAndrews

[57] ABSTRACT

A tray for receiving, positioning and holding variously sized x-ray film cassettes in a substantially fixed position has substantially fixed dimensions and no adjustable parts. The tray includes a plurality of tiers, each tier having a fixed side support wall and a fixed base support ledge. The walls and ledges define corner blocks which cooperate with the edges of a film cassette to prevent both vertical and horizontal movement of the cassette.

9 Claims, 4 Drawing Figures

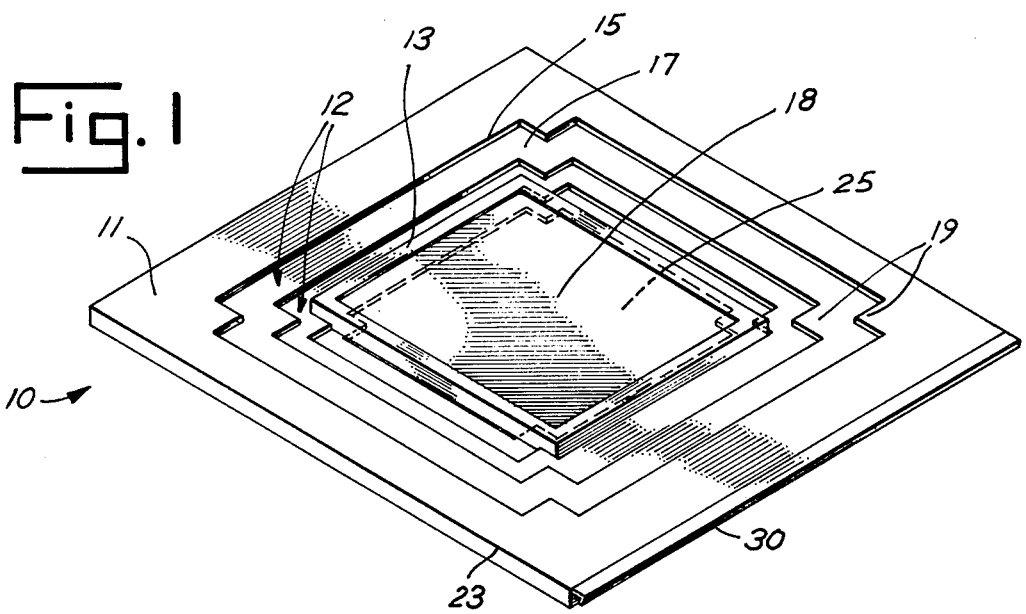
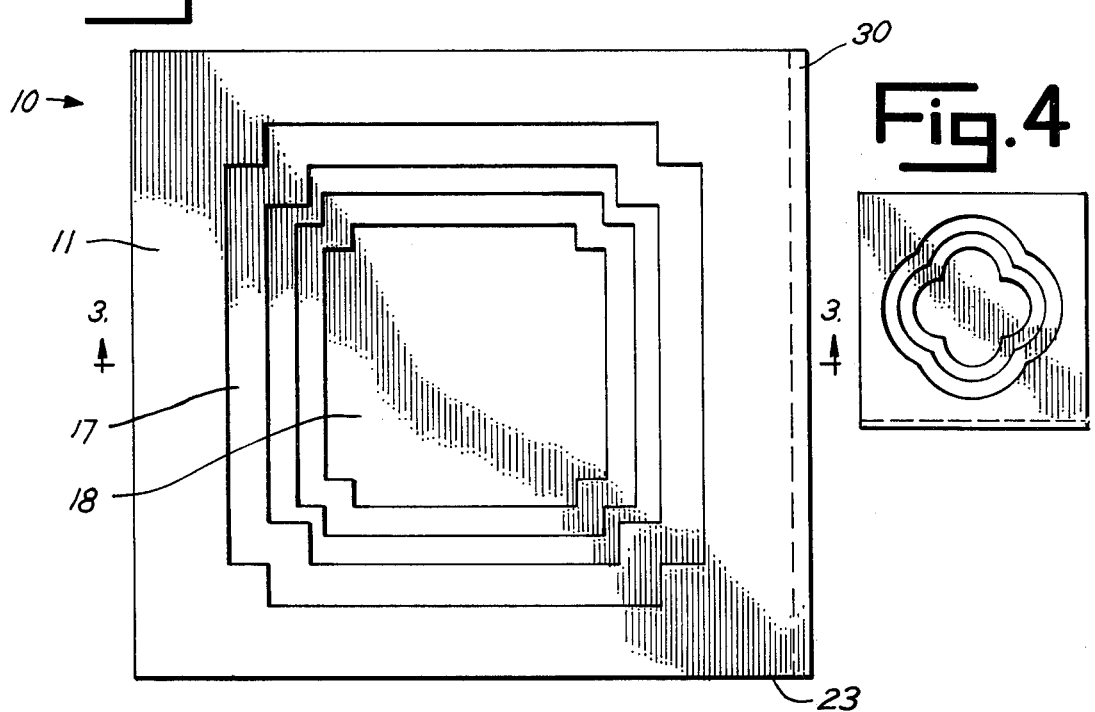
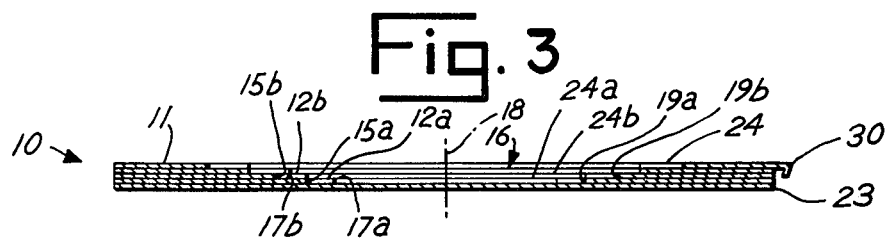

TRAY FOR X-RAY FILM CASSETTES

BACKGROUND OF THE INVENTION

The present invention relates generally to a tray for positioning and holding x-ray film cassettes in a machine for taking x-ray photographs. It is important in the use of x-ray equipment that the film cassette be properly positioned with respect to the collimated x-ray beam so that the x-radiation will impinge upon a selected area of the film and will not fall outside the margins of the film. This is of particular importance when the equipment or system is being utilized in connection with exposure of a portion of a human body because evidence suggests that radiation is harmful to living beings. Thus, it is desirable to avoid unnecessary exposure of parts of the body and improper film positioning which may require repeated exposure. These considerations are expected to become more important as state and federal governments take an increasing interest in the amount of radiation to which a human individual should be exposed.

Generally, a film bearing tray is disposed beneath a table on which the patient is lying. An x-ray generator is located above the patient at a predetermined focal distance from the film. When the x-ray collimator is suitably adjusted, the cross-sectional size and shape of the cone of radiation produced by the generator is no larger at the film level than the size of the film. Thus, if the film is properly positioned, the patient is exposed to radiation only in the area requiring diagnosis or treatment, and is not exposed in adjacent or unnecessary areas.

X-ray systems of this type generally employ a film tray, sometimes called a "Bucky" tray (See BUCKY, U.S. Pat. No. 1,658,833), which carry and position film cassettes of various selected sizes bearing x-ray sensitive film. In addition to the "bucky" tray other examples of tray systems known and used for this purpose are shown and described in U.S. Pat. Nos. 3,581,094 and 3,777,162.

The conventional x-ray film traya are believed to introduce potential inaccuracies in positioning the film because of the various adjustable bracing and clamping arrangements which are used. Inaccuracies may be introduced by improperly functioning clamping devices, or by careless or poorly trained technicians who take improper precautions when clamping or bracing the film. Such malfunctions or improper use will result not only in poor quality films and poor diagnosis, but also in subjection of the patient to undesirable and unnecessary radiation.

To overcome these problems, some x-ray machines have a collimator designed to operate automatically in response to electrical signals corresponding to the size and position of the cassette on the tray. However, even with such a device improper positioning or holding of the film cassette will cause improper signals to be transmitted to the collimator, resulting in the production of an x-ray beam of improper size or position. This could also unnecessarily produce radiation which is harmful to a patient.

The invention is directed to a tray for film cassettes which is believed to improve over these conventional trays.

SUMMARY OF THE INVENTION

In a principal aspect, this invention pertains to a tray for receiving, positioning and holding any of a variety of differently sized film cassettes of the type having lateral surfaces and a base surface. The tray has a plurality of support tier members which define an interior of the tray. Each tier has fixed side support walls and an intersecting fixed base support ledge. The walls and ledge form corner blocks which substantially engage at least a portion of the lateral surfaces and base surface of the film cassette to restrain the cassette in a substantially fixed position.

The corner blocks, or the ledge and walls of each tier are generally arranged so that the dimensions of the different tiers substantially correspond to the size or dimensions of different, standard sized film cassettes. Thus, the plurality of tiers receive, position and hold in a substantially fixed position any of a plurality of different sized film cassettes.

The tray is advantageously constructed so that the tiers are arranged in order of the successively increasing sizes of the film cassettes to which the tiers correspond. The walls preferably intersect each other to form a plurality of corner blocks adapted so that a longitudinal axis of the film cassette can be oriented in a multiplicity of positions in relation to a reference axis in a plane of the tray, i.e., a number of corner blocks are arranged so that each tier is adapted to position the cassette in a plurality of fixed positions in a single tier.

Thus, it is an object of the present invention to provide an apparatus which has the necessary fixed dimensions to properly receive, position and securely hold a variety of different sized film cassettes without making mechanical adjustments to adjust the dimensions of the tray to fit those of the film cassette.

It is further an object of the invention to provide a tray for film cassettes which will reduce the likelihood of inadvertent exposure of the patient to radiation and of repeated deliberate exposure of the patient to radiation necessitated because an earlier exposure was improperly taken.

It is another object of this invention to provide a more economical device for receiving, positioning and securely holding film cassettes.

And it is still a further object of this invention to provide a device which will receive, position and securely hold film cassettes more conveniently than present such film cassette trays.

These and other objects, advantages and features of the invention will be set forth in detail in the description which follows.

BRIEF DESCRIPTION OF THE DRAWING

In the detailed description which follows, reference will be made to the drawing comprised of the following figures:

FIG. 1 is a top perspective view of a preferred embodiment of the tray shown holding a rectangular film cassette;

FIG. 2 is a top plan view of the tray indicating the relative horizontal dimensions of the various tier and ledges;

FIG. 3 is a vertical cross-sectional view of the tray taken along the line 3—3 of FIG. 2; and FIG. 4 is a top perspective view of an embodiment of the tray designed to hold oval-shaped film cassettes.

DESCRIPTION OF THE PREFERRED EMBODIMENT

Referring to the figures, the tray, generally 10, is preferably a planar, rectangular object formed according to the description herein from plastic materials by conventional plastic molding techniques. Alternatively, the tray 10 is formed by adhering or annealing into a single unit a plurality of frames having open interiors of different dimensions sandwiched together in a concentric manner. The tray 10 is also formed by machining a planar block of wood, metal or other suitable material to provide a multi-tiered open interior.

The tray 10 includes a planar surface 11 and a plurality of tier members, generally 12, which support, position and hold an x-ray film cassette 13 as shown in FIG. 1. Each tier 12 has a fixed side support wall 15 which intersects the plane of surface 11 of the tray thus defining a recess 16 in the surface of the tray 10 as shown in FIG. 3. Preferably, the wall member 15 is perpendicular to the tray surface 11. Each tier 12 also has a fixed base support ledge 17, shown in FIGS. 1 and 2, as being parallel with the surface 11. The ledge member 17 projects from the wall member 15 toward a center 18 of the tray 10 as shown in FIG. 3. The plurality of tiers 12 form a recessed, multi-tiered interior as shown in FIG. 1.

The walls 15 and intersecting ledge 17 form corner blocks 19 which cooperate with the lateral and base surfaces of a cassette 13 to prevent any sideway or downward movement of the cassette 13. The corner blocks preferably secure five of the six degrees or directions of free movement of the cassette 13, i.e., prevents downward movement and movement in any of the four directions of the horizontal plane, permits only upward movement of the cassette 13. The corner blocks 19 are preferably positioned parallel to a peripheral edge 23 of the rectangular tray 10 so that the recess 16 defined by walls 15 has a generally rectangular-shaped opening 24. The length and width of the openings 24 formed by a particular tier 12 is defined by the distance separating opposed walls 15 of the tier 12. The walls 15 are fixed in pre-selected positions so that the dimensions of a particular opening 24 and recess 16 will correspond, at least in part, to the length and width of a particular standard sized x-ray film cassette 13.

The plurality of tier members 12 are arranged in order of successively increasing dimension with the walls 15a of a first tier 12a being adjacent the ledge 17b of a second tier 12b. For example, a tier member 12a defines a first recess 16a and opening 24a having dimensions which substantially correspond to the smallest size of standard x-ray film cassette cartridge in terms of length and width. Tier member 12b has walls 15b which define an additional recess 16b and opening 24b having dimensions which substantially correspond to the next largest x-ray film cassette in terms of length and width. The first tier member 12a is preferably placed in the bottom location of the interior 25, that is, the location which is farthest from the open side of interior 25. The second tier 12b is preferably placed so that ledge 17b of the second tier 12b is adjacent the walls 15a of the first tier 12a with the ledge 17b of the second tier 12b closer to the open side of the interior 25 than is the ledge 17a of the first tier 12a. Arrangement of the plurality of remaining tier members 12 in a similar manner thus defines the recessed, multi-tiered interior 25 of the tray 10.

The cassette tray 13 is placed into the interior 25 of the tray 10 so that the edges of the cassette tray 13 are substantially parallel to corner blocks 19. The film cassette 13 is lowered into the interior 25 of tray 10 until the underside of the film cassette 13 contacts the ledge 17 of a particular tier 12a, and the cassette 13 comes to rest in a particular recess 16a. The ledge 17a thus supports the underside of an x-ray film cassette 13 and prevents dropping or downward movement of the cassette 13a. The walls 15a preferably abut all four sides of the x-ray film cassette 13 and prevent all sideways motion of the cassette 13. Thus the corner blocks 19a, shown in FIG. 3, prevent movement of a film cassette 13 which has been positioned within a tier 12a of the tray 10.

In preferred form my tray is provided with a hook-like projection 30 which runs along the length of one peripheral edge 23 of the tray 10. This projection 30 acts as a handle to facilitate movement of the tray in and out of the machine for taking x-ray pictures.

In preferred form, the walls 15 of the tiers 12 are arranged so the tier 12 can position the film cassettes 13 in a multiplicity of positions in a plane. That is, the walls 15 intersect each other to form corner blocks 19. A plurality of corner blocks 19 are arranged in a tier 12 so that the tier 12 provides a number of fixed positions to accommodate the cassette 13.

The film cassettes conventionally used in this country have an oblong, rectangular shape, as shown by cassette 13 in FIG. 1. But as seen in FIGS. 1 and 2, the preferred configuration of the open interior 25 defined by the walls 15 is not a simple oblong rectangle. Rather, the shape of the open interior 25 is that which results when a first oblong rectangle is super-imposed over a second oblong rectangle with the axial length of the second rectangle being in one of a multiplicity of positions, generally transverse in relation to the axial length of the first rectangle. This configuration of the tray 10 is preferred so that the conventional film cassettes 13 can be oriented to receive an image of an arm or leg, for example, arranged in various positions. It would also be possible, of course, to construct the tiers 12 so that a film cassette 13 could be positioned along three or more alternative axes within a single level of open interior 25.

The above description refers to a preferred embodiment as described and illustrated in the drawing. However, alternative configurations and modifications are possible within the scope of the invention. For example, it may be possible to manufacture a suitable tray 10 wherein certain of the tier members 12 are formed with ledge members 17 that do not extend parallel to all peripheral edges 23 of the tray 10. It may be desired to use the tray 10 in vertical position, as well as in the horizontal position as depicted in the drawings. Or it may be desired to make a tray 10 which would accommodate oval-shaped film cassettes 13, or any shape other than oblong, rectangular. In each of these alternatives the concept of the invention and the relationship between the tier members 12 and the film cassettes 13 would remain substantially unchanged. Therefore, the matter of this invention is to be limited by only the following claims and their equivalents.

What is claimed is:

1. A tray for film cassettes of the type having lateral surfaces and base surface, said tray comprising, in combination:

a plurality of cassette support tiers, each tier including fixed side support walls and an intersecting fixed base support ledge, said walls and ledge forming a plurality of fixed corner blocks which substantially engage said lateral surfaces and base surface of said cassette to restrain said cassette in a substantially fixed position, whereby said tray restrains any of a plurality of different sized film cassettes.

2. A tray as claimed in claim 1 wherein adjacent tiers are arranged in successively increasing size.

3. The tray of claim 1 wherein at least one of said tiers further includes means for positioning said film cassettes in a plurality of substantially fixed positions in a plane.

4. The tray of claim 1 wherein said walls of said tier intersect with each other to define a plurality of corner blocks in said tier, said corner blocks substantially adapted to position said cassette in a plurality of substantially fixed positions in a plane.

5. The tray of claim 1 wherein said tier includes corner blocks comprising at least one right angle, said corner blocks adapted to restrain a rectangular film cassettes.

6. The tray of claim 1 wherein said tier includes a plurality of corner blocks comprising right angles, said corner blocks adapted to restrain a rectangular film cassette in a plurality of substantially fixed positions in a plane.

7. The tray of claim 1 wherein said corner block restrain five degrees of freedom of said cassette tray.

8. The tray of claim 1 wherein said tier includes corner blocks adapted to restrain an oval shaped film cassette.

9. The tray of claim 1 wherein said tier includes plurality of corner blocks, said corner blocks adapted to restrain an oval film cassette in a plurality of substantially fixed positions in a plane.

* * * * *